US006869014B2

(12) United States Patent
Gerstenkorn

(10) Patent No.: US 6,869,014 B2
(45) Date of Patent: Mar. 22, 2005

(54) SYSTEM FOR SECURITY CONTROL OF PERSONS/GOODS, AND/OR FOR TRANSPORTING PERSONS/GOODS, CONTROL DEVICE FOR COMMANDING THIS SYSTEM, AND METHOD OF OPERATING THIS SYSTEM

(75) Inventor: Bernhard Gerstenkorn, Luzern (CH)

(73) Assignee: Inventio AG, Hergiswil ( * ) Notice: Subject to any disclaimer, the term of this patent is extended or adjusted under 35 U.S.C. 154(b) by 63 days.

(21) Appl. No.: 10/228,299

(22) Filed: Aug. 26, 2002

(65) Prior Publication Data

US 2003/0043018 A1 Mar. 6, 2003

(30) Foreign Application Priority Data

Sep. 3, 2001 (EP) .......................................... 01121053
Sep. 20, 2001 (EP) .......................................... 01810910

(51) Int. Cl.[7] .......................................... G06F 17/60
(52) U.S. Cl. ...................... 235/385; 235/382; 235/375
(58) Field of Search ............................... 235/375, 380, 235/382.5, 385, 382; 340/10.1–10.6, 572.1–572.9, 5.1–5.25, 5.92; 705/22, 28

(56) References Cited

U.S. PATENT DOCUMENTS 4,808,803 A 2/1989 Magier et al.
5,793,290 A * 8/1998 Eagleson et al. ........ 340/573.4
6,411,199 B1 * 6/2002 Geiszler et al. ............ 340/10.1
6,615,175 B1 * 9/2003 Gazdzinski ................. 704/275

FOREIGN PATENT DOCUMENTS

| | | |
|---|---|---|
| EP | 0 699 617 | 3/1996 |
| WO | 00/77717 | 12/2000 |

* cited by examiner

*Primary Examiner*—Michael G. Lee
*Assistant Examiner*—Jamara A. Franklin
(74) *Attorney, Agent, or Firm*—Butzel Long

(57) ABSTRACT

A control device for transportation or access, and to a system for security control of persons/goods and/or for transporting persons and/or goods, and to a method of operating such a system wherein at least one response signal is emitted by at least one identification transmitter. This response signal is received by at least one recognition device and recognized with a recognition protocol. For one recognized response signal, one control signal according to a control protocol of the recognition device is emitted. The control device reads control signals according to at least two different control protocols and recognizes these control signals, and for one recognized control signal emits at least one secondary control signal.

9 Claims, 5 Drawing Sheets

SYSTEM FOR SECURITY CONTROL OF PERSONS/GOODS, AND/OR FOR TRANSPORTING PERSONS/GOODS, CONTROL DEVICE FOR COMMANDING THIS SYSTEM, AND METHOD OF OPERATING THIS SYSTEM

BACKGROUND OF THE INVENTION

The present invention relates to a system for the security control of persons and/or goods, and/or for transporting persons and/or goods, a control device for commanding this system, and a method of operating this system according to the definition of the patent claims.

Systems for security control of persons/goods are known. Such systems control, for example, access/exit to/from buildings, floors of buildings, rooms, but also access to objects such as vehicles, electronic computers, automated teller machines, etc. Means of access such as, for example, doors, compartments, flaps, etc. are operated.

For contactless operation, for example, of such a system, use is known of an identification transmitter in the form of a transponder and a corresponding device to recognize the transponder. For example, a transponder antenna constructed as a coil inductively absorbs energy from an electromagnetic field which is radiated by the recognition device. This energy is used to read out an identification code written in a memory of the transponder, and to transmit this identification code as a response signal. The response signal is received and electronically processed by the recognition device, for example the response signal is recognized by the recognition device according to a recognition protocol. The recognized response signal is passed on to a control device of the security system, for example the control signal is passed on to the control device according to a control protocol. The control device reads and analyzes the control signal according to this control protocol and, on successful analysis, operates the system, for example operates the control device of an access means.

Certain systems for the transportation of persons and/or goods enable identification of persons/goods for transportation, and also enable transportation controlled by this identification of the identified persons/goods in individual and public means of transportation. Thus, the European patent application EP 0 699 617 shows a device for the control of an elevator installation, in which the elevator installation is controlled contactlessly by a person with an identification transmitter and its identification device. The identification transmitter is a transponder, which transmits an identification code to the identification device, which identification device recognizes the identification code, and sends it on as a control signal to a processing unit. The processing unit reads this control signal and assigns to it a predefined desired travel destination. The bearer of the identification code is thereby identified, and a travel destination assigned to this person. The processing unit transmits a corresponding control signal to the elevator installation, which then automatically, and without intervention by the person, transports the person to this destination.

A first purpose of the present invention is to provide a general system for security control of persons/goods and/or for transportation of persons/goods, a control device to control this system, and a method of operating this system, identification transmitters of the persons/goods for transportation enabling in a first function a security control in the system of the persons/goods, and the aforesaid identification transmitters enabling in a second function transportation in the system of the persons/goods.

Many different standards for identification transmitters and recognition devices respectively have now established themselves on the market. Identification transmitters and recognition devices have different radio frequencies such as 125 kHz, 13.56 MHz, 2.45 GHz, etc. The manufacturers of identification transmitters and recognition devices also use recognition and control protocols which differ from, and have only little or no compatibility with, each other. For example, the control protocols are of serial or parallel type. For example, the data formats of the transmitted control signals are different depending on the standard or manufacturer. The transmission speeds of the control signals may also be different depending on the standard and/or manufacturer.

A generally functioning system comprising identification transmitter, recognition device, control device, and transportation means is difficult to realize because of the large number of standards established on the market for identification transmitters and recognition devices. Different companies occupying a building use different systems of their own for access control. If a large number of companies occupy the building, there is a high probability that not all companies have selected the same identification standard for their company-own security control system, and therefore not all persons/goods to be transported which have company-own identification transmitters can use a common system.

As a solution to the incompatibility problem, the companies are offered additional so-called elevator-installation identification transmitters and elevator-installation recognition devices. Apart from the additional costs which the provision of such elevator-installation identification transmitters and elevator-installation recognition devices cause, the persons/goods to be transported must either bear these elevator-installation transmitters in addition to the company identification transmitters, and/or these elevator-installation recognition devices must be placed in addition, and usually in close proximity, to the company recognition devices. Complications can also arise if elevator-installation recognition devices and company recognition devices operate on identical radio frequencies and arc placed in close proximity to each other, for example detuning or resonance of these identification transmitters may occur which interferes with their functioning.

A second purpose of the present invention is to provide a system for security control of persons/goods and/or for the transportation of persons/goods, a control device for commanding this system, and a method of operating this system, it being possible to use identification transmitters of different identification transmitter standards side by side in simple and inexpensive manner.

A third purpose of the present invention is to provide a system for security control of persons/goods and/or for transportation of persons/goods, a control device for controlling this system, and a method for operating this system which are easy to operate and secure for the companies.

A fourth purpose of the present invention is to provide a system for security control of persons/goods and/or for transportation of persons/goods, a control device for commanding this system, and a method of operating this system which are compatible with known and proven standards of identification transmitters and recognition devices.

A fifth purpose of the present invention is to provide a system for security control of persons/goods and/or for transportation of persons/goods, a control device for commanding this system, and a method of operating this system, individual characteristics and needs of persons/goods in elevator installations and/or escalators being better recognized.

A sixth purpose of the present invention is to provide a system for security control of persons/goods and/or for transportation of persons/goods, a control device for commanding this system, and a method for operating this system, interactions between persons/goods to be transported being better respected.

A seventh purpose of the present invention is to provide a system for security control of persons/goods and/or for transportation of persons/goods, a control device for commanding this system, and a method of operating this system, collective characteristics and needs of persons/goods being better recognized.

SUMMARY OF THE INVENTION

The present invention concerns an apparatus having at least one control device for controlling a system for security control of persons/goods and/or for transportation of persons/goods. The system comprises at least one identification transmitter, at least one recognition device, and at least one transportation means and/or at least one access means. At least one response signal is emitted by at least one identification transmitter, at least one response signal is received by at least one recognition device, and at least one control signal according to one control protocol is emitted by the recognition device.

The advantage of the present invention is that the control device reads and recognizes control signals according to at least two different control protocols. Advantageously, control signals which are transmitted to the control device in different control protocols are converted into control signals according to a uniform standard protocol. Advantageously, exactly one user profile is assigned to at least one control signal according to the standard protocol of the control device. Advantageously, this user profile is used by the control device to generate a secondary control signal. For one recognized control signal, the control device emits at least one secondary control signal. Advantageously, with this secondary control signal a transportation means or an access means is commanded. The control device therefore allows several different standards of information emitters and recognition devices to be used to command a transportation means or an access means, for example specifically according to a user profile.

Advantageously, persons/goods are transported by elevator installations and/or escalators in such manner that the transported persons and/or persons requiring the goods to be transported can be satisfied in outstanding manner. This is achieved by extensive configuration of a system for transportation of persons/goods.

"Extensive configuration" means that in a first step at least one user profile is created for the persons/goods to be transported. There are different profiles:

- a spatial user profile, or zone profile, where a spatial access authorization of the user in zones is defined; and/or
- a temporal user profile, or period profile, where temporal rights of the user are defined in periods; and/or
- a person/goods-specific user profile, or individual profile, where individual information about the user such as user name, office/floor, building/office number, telephone number, birthday, sex, weight, etc. are defined, and where also preferences of the user such as the type of news the user does or does not wish to receive in the means of transport are defined; and/or
- a group-specific user profile, or group profile, where information regarding priority when transporting the users, etc. is defined; and/or
- a security-relevant user profile, or security profile, where information about security aspects of the user, such as a hazard/risk assessment (Does/do the person/goods present a hazard? And if so, for which other person/goods to be transported? Is/are the persons/goods exposed to hazards? And if so, what steps should be taken if an emergency occurs?) are defined.

These components, zone profile, period profile, individual profile, group profile, and security profile, of a user profile can be combined with each other in any manner.

Extensive configuration means further, that in a second step either one user profile is used as a transportation profile or at least two user profiles of persons/goods to be transported are linked together and thereby result in at least one situatively adapted transportation profile. Advantageously, user profiles of persons/goods to be transported are set in relation to at least one logical gate to produce a transportation profile.

In this manner, travel plans for the persons/goods to be transported can be easily and quickly assembled. At least one person/goods item to be transported is recognized by at least one recognition device via at least one identification code. This recognized identification code is passed on to at least one control device. Either at least one user profile of at least one person/goods item to be transported is made ready for each recognized identification code, or user profiles of at least two persons/items of goods to be transported are linked to form a transportation profile. At least one transportation means such as an elevator installation or an escalator or a door is commanded by the control device according to this transportation profile.

This extended configuration of user profiles corresponds to a large extent with what is known from computer-aided network technology, where the rights of users in a network are administered and assigned by an administrator. Surprisingly, an application of this network administration has so far not been realized in systems for transportation of persons/goods.

There are several reasons for this:

- One reason is that the wishes and needs of users of transportation means have so far not been clearly articulated, and/or the wishes and needs of the users of means of transportation have so far not been captured in an extensive configuration.
- Another reason is that satisfaction of the wishes and needs of the users according to the present invention has not been technically possible, for example because no standard has established itself and/or because the computers and/or computer program products necessary for this purpose were insufficiently powerful and/or too expensive.
- Finally, prejudices of the experts in the field had to be overcome. The machine industry, which manufactures means of transportation, clung to its traditional technical areas and had restricted itself to producing and operating mechanically stable and inexpensive means of transportation. Until now, the machine industry had not set itself the task of the present invention: until now, the machine industry had more or less ignored the wishes and needs of the users of means of transportation. Until now it has also hardly, or not at all, concerned itself with the new technologies necessary for the solution of the invention such as identification codes and means of recognition, or with computers and computer program products.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
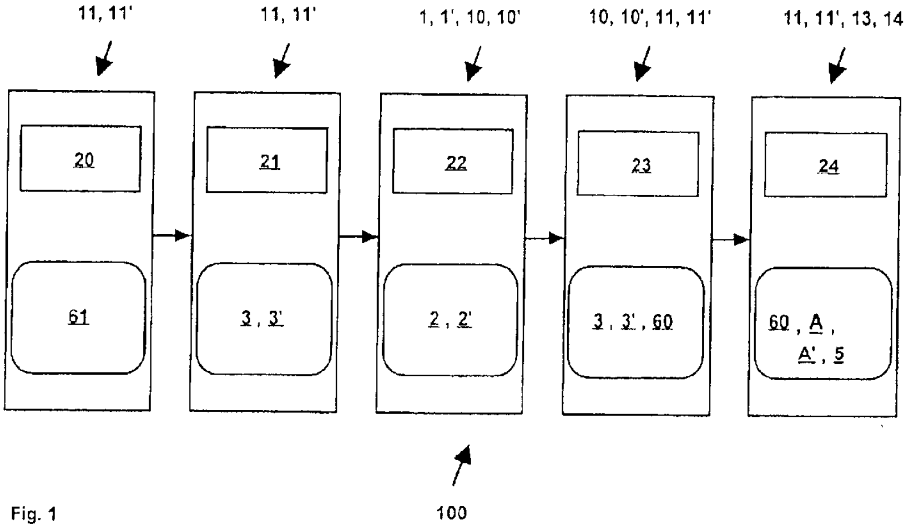
FIG. 1 is a block diagram of a method of functioning of a system for security control of persons/goods and/or for transportation of persons/goods according to the present invention.
Figure 2:
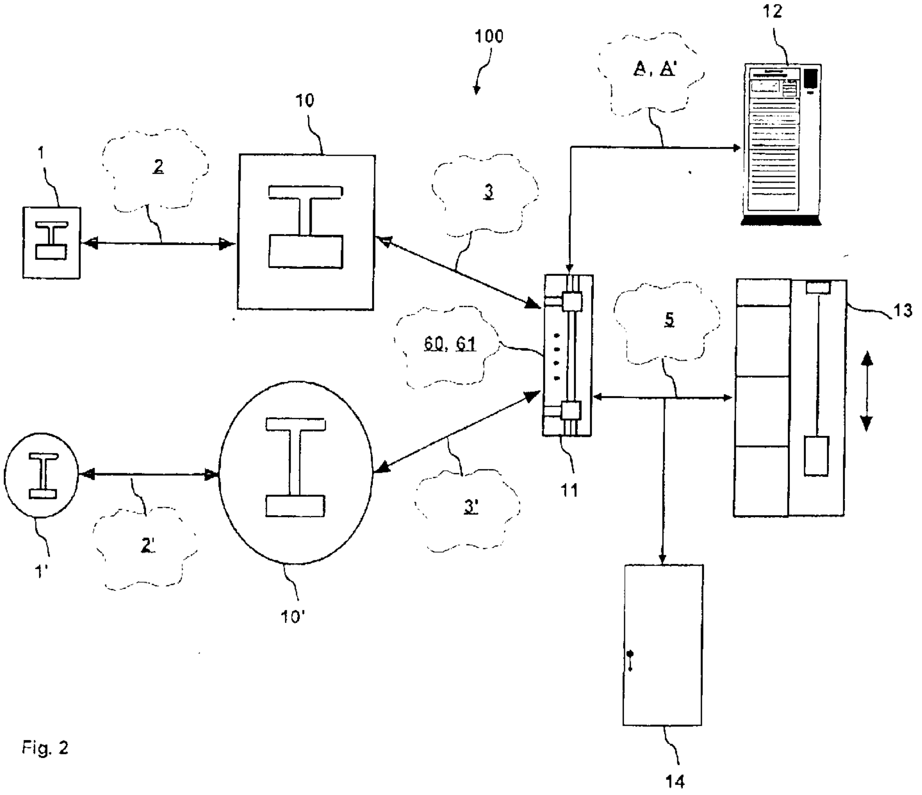
FIG. 2 is a flow diagram illustrating the principle of a first exemplary embodiment of a system for security control of persons/goods and/or for transportation of persons/goods according to the present invention.
Figure 3:
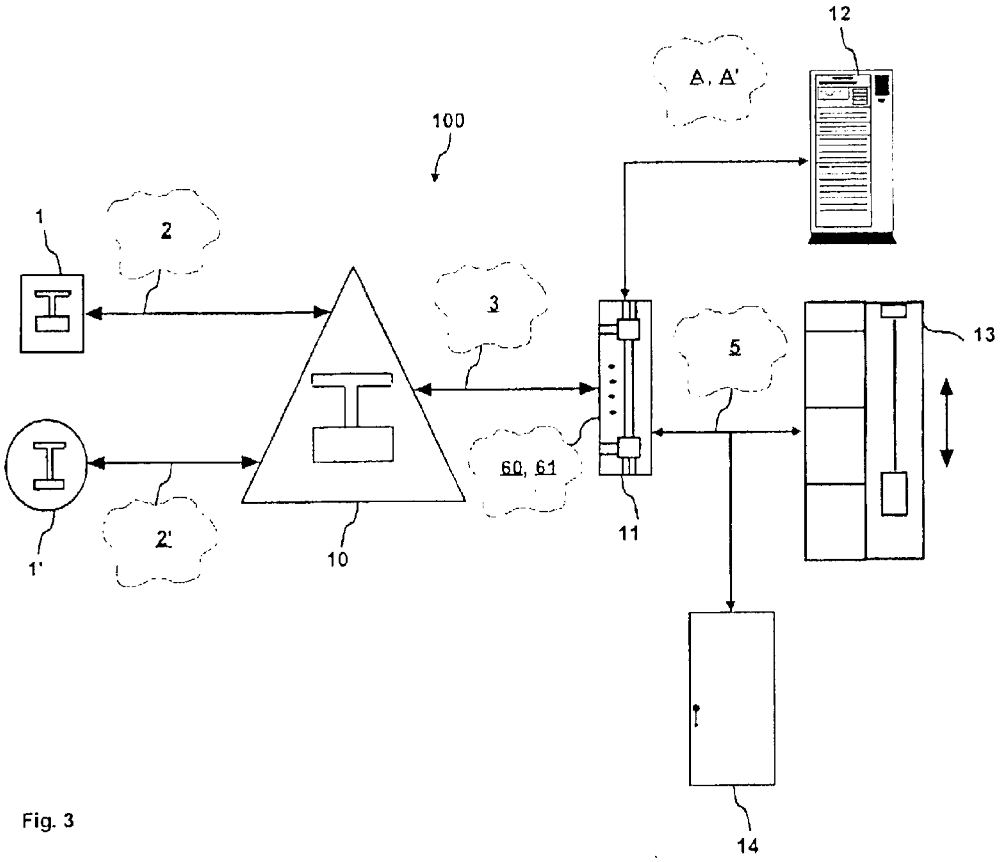
FIG. 3 is a flow diagram illustrating the principle of a second exemplary embodiment of a system for security control of persons/goods and/or for transportation of persons/goods according to the present invention.
Figure 4:
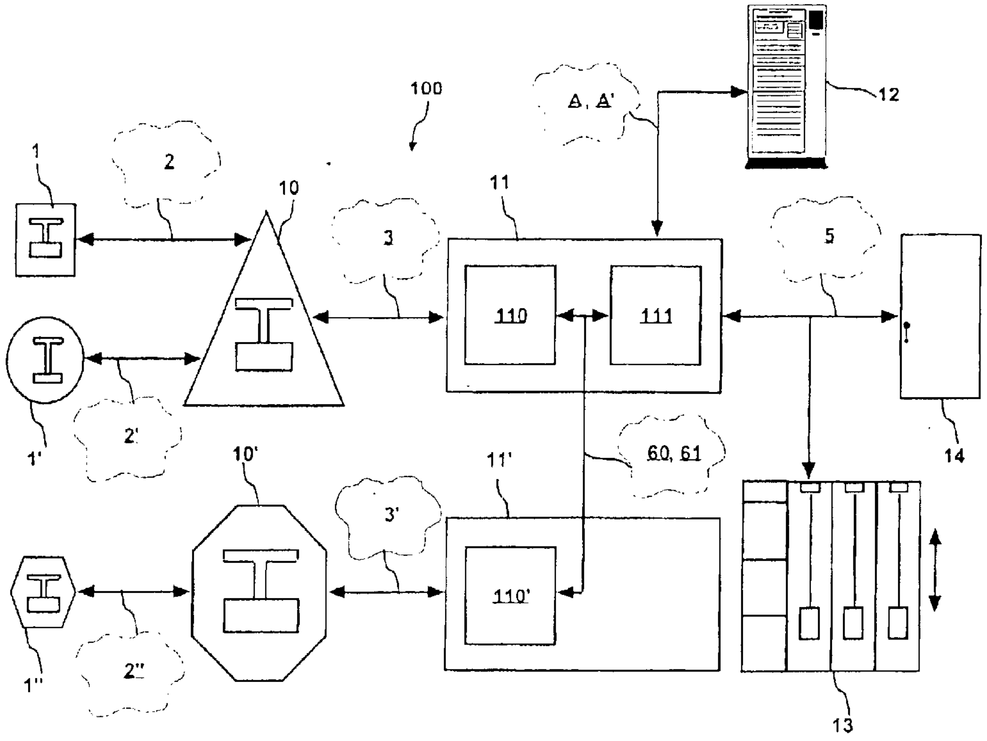
FIG. 4 is a flow a diagram illustrating the principle of a third exemplary embodiment of a system for security control of persons/goods and/or for transportation of persons/goods according to the present invention.

FIG. 1 is a block diagram and FIGS. 2 to 4 are flow diagrams illustrating the principle of exemplary embodiments of a system 100 for security control of persons/goods and/or for transportation of persons/goods. The system 100 comprises at least one identification transmitter 1, 1', 1", at least one recognition device 10, 10', at least one control device 11, 11', and at least one transportation means 13, and/or at least one access means 14. The identification transmitter 1, 1', 1" communicates with the recognition device 10, 10' and serves for identification of a person or an item of goods. Advantageously, the identification transmitter 1, 1', 1" is mobile and borne by the person or item of goods, whereas the recognition device 10, 10' is mounted in a fixed position, for example near the transportation means 13 or access means 14. The bearer of the identification transmitter 1, 1', 1" is thereby identified.

The identification transmitter 1, 1', 1" is, for example, a transponder with transponder antenna and transmitter electronics. The transmitter electronics of the identification transmitter 1, 1', 1" have, for example, a transmitter and receiver unit and a memory containing at least one item of information. This information comprises, for example, information about the identification transmitter standard, according to which the identification transmitter is readable and writable, and/or a serial number of the identification transmitter with which the identification transmitter is uniquely identifiable, and/or an identification code according to which the bearer of the identification transmitter is identifiable. The memory is readable and writable and has a size of, for example, from 32 bits to 8 kbits. The identification transmitter 1, 1', 1" can be actively supplied with an operating voltage from a battery or storage battery, but it can also be passively supplied with an operating voltage by induction from an electromagnetic field. Preferably, the recognition device 10, 10' radiates such an electromagnetic field. The recognition device 10, 10' has a correspondingly constructed transmission and reception antenna and an electronic reading and writing unit. For example, the reading and writing unit of the recognition device 10, 10' has a memory for a recognition protocol and a processor to execute the recognition protocol. Recognition protocols have many variations. For example, communication between identification transmitter 1, 1', 1" and recognition device 10, 10' may be encrypted, and the identification transmitter 1, 1', 1" may also demand a password from the recognition device 10, 10' before it is readable and/or writable. In FIGS. 2 to 4, the antennae of identification transmitter 1, 1', 1" and the recognition device 10, 10' are diagrammatically represented by "T" while the electronics of the identification transmitter 1, 1', 1" and the recognition device 10, 10' are diagrammatically represented as rectangles. Self-evidently, with knowledge of the present invention, a person skilled in the art can realize unlimited variations of this embodiment of an identification transmitter and/or a recognition device intended for it. Thus, other identification transmitters, for example such as use light as the basis for contactless communication with a recognition device, can also be used. The presented embodiment of an identification transmitter and a recognition device intended for it respectively is exemplary and not restrictive for the scope of application and/or protection of the invention. In particular, the invention is not restricted to contactlessly communicating identification transmitters. Thus, identification transmitters in the form of magnetic cards, electronic chips, etc, which communicate with a recognition device via at least one intermediary contact, can also be used.

Communication between identification transmitter 1, 1', 1" and recognition device 10, 10' takes place, for example, by means of radio frequencies preferably in the range of from 50 kHz to 6 GHz, preferably at standardized radio frequencies of 125 kHz or 13.56 MHz or 2.45 GHz, etc. The processor of the recognition device 10, 10' executes the recognition protocol and independently transmits an interrogation signal at a radio frequency via, for example, the transmitting and receiving antenna. As soon as the identification transmitter 1, 1', 1" is carried into the transmission and reception range of the recognition device 10, 10', the identification transmitter 1, 1', 1" receives with the transponder antenna the interrogation signal and emits as response signal 2, 2', 2" to the recognition device 10, 10' the information stored in the memory of the transponder about the identification transmitter standard, and/or the serial number of the identification transmitter stored in the memory of the transponder, and/or the identification code stored in the memory of the transponder. An advantageous transmission and reception range is, for example, from 2 to 50 cm. In the exemplary embodiments of the system 100 according to FIGS. 2 to 4, transmission/reception of interrogation signals and/or response signals 2, 2', 2" is bidirectional and represented diagrammatically as a double-headed arrow. The response signal 2, 2', 2" is, for example, received and electronically processed by the transmission and reception antenna of the recognition device 10, 10'. For example, the response signal 2, 2', 2" of the recognition device 10, 10' is recognized with a recognition protocol. The recognition protocol can be created individually, but it can also be standardized in industrial standards. On recognition of a response signal 2, 2', 2", a control signal according to a control protocol 3, 3' is emitted to the control device 11, 11'. Self-evidently, with knowledge of the present invention, a person skilled in the art can realize unlimited variations of the embodiment of the communication of an identification transmitter with a recognition device intended for it. The presented communication between an identification transmitter and a recognition device intended for it is exemplary and not restrictive for the scope of application and/or protection of the invention. Thus, other contactless and/or contacting communication between an identification transmitter and a recognition device intended for it can also be used. The information relating to the radio frequencies used and the advantageous transmission and reception range are also freely variable.

In the first exemplary embodiment of a system 100 according to FIG. 2, two identification transmitters 1, 1', two recognition devices 10, 10', and one control device 11 are shown. In the second exemplary embodiment of a system 100 according to FIG. 3, two identification transmitters 1, 1', one recognition device 10, and one control device 11 are shown. In the third exemplary embodiment of a system 100 according to FIG. 4, three identification transmitters 1, 1', 1", two recognition devices 10, 10', and two control devices 11, 11' are shown. The identification transmitters 1, 1', 1", the recognition devices 10, 10', and the control devices 11, 11' can be operated according to different and not mutually compatible standards. The difference in the standards of identification transmitters and recognition devices respectively lies, for example, in different radio frequencies and/or in different recognition and/or control protocols. For example, the control protocols are of serial or parallel type. For example, the data formats of the control protocols are different depending on the manufacturer. With data transmission according to a serial control protocol, data can be 8 or 9 bits long, data can also be transmitted with or without parity, and a check sum can also be different. Transmission speeds of the control protocol can also differ depending on the standard or manufacturer. For example, a baud rate can be 9600 baud or a multiple thereof. A transmission speed of the control protocols can also, depending on the standard or manufacturer, be specified by the manufacturer as fixed, or a user can choose between various transmission speeds of the control protocol.

Such a difference of the standards is illustrated diagrammatically in the first exemplary embodiment of a system 100 according to FIG. 2 by a rectangular first identification transmitter 1 and a rectangular first recognition device 10, and by an oval second identification transmitter 1' and an oval second recognition device 10'. For example, the first identification transmitter 1 and the first recognition device 10 communicate with each other according to a first recognition protocol, and the second identification transmitter 1' and the second recognition device 10' communicate with each other according to a second recognition protocol. These two recognition devices 10, 10' also transmit control signals to the control device 11 according to different control protocols 3, 3'.

The situation is different in the second exemplary embodiment of a system 100 according to FIG. 3, where a rectangular first identification transmitter 1 and an oval second identification transmitter 1' and a triangular recognition device 10 communicate with each other with a common recognition protocol. This recognition device 10 transmits to the control device 11 according to a uniform control protocol 3.

In the third exemplary embodiment of a system 100 according to FIG. 4, the situation is different again. Here, a rectangular first identification transmitter 1 and an oval second identification transmitter 1' communicate with a triangular first recognition device 10 with a common recognition protocol, and a hexagonal third identification transmitter 1" communicates with a hexagonal second recognition device 10' with a further recognition protocol. The triangular first recognition device 10 transmits according to a first control protocol 3 to a first control device 11, the hexagonal second recognition device 10' transmits according to a second control protocol 3' to a second control device 11'. For example, the first recognition device 10 operates on a first radio frequency and the second recognition device 10' operates on a second radio frequency, which first and second radio frequencies are different. For example, the first and second recognition devices 10, 10' use different recognition protocols. For example, the first and second control devices 11, 11' use different control protocols 3, 3'. These differences of standards can be combined without limit, which increases the large number of differences of the standards.

The control device 11, 11' is connected by wire or radio to at least one recognition device 10, 10'. For example, the recognition device 10, 10' and the control device 11, 11' are connected to each other via a serial interface such as RS232, USB (universal serial bus), etc. The invention is not restricted to the use of serial interfaces between the recognition device 10, 10' and the control device 11, 11': self-evidently, depending on the standard or manufacturer of recognition devices 10, 10', the use of parallel interfaces is also possible. Communication between recognition device 10, 10' and control device 11, 11' takes place according to an identical control protocol 3, 3': it is bidirectional and represented diagrammatically as a double-headed arrow. When communicating, the recognition device 10, 10' transmits control signals, while the control device 11, 11' performs, for example, interrogations of the recognition device 10, 10'.

Advantageously, the control device 11, 11' has at least one processor 110, 110' to execute at least two different control protocols 3, 3'. For example, the control protocols 3, 3' are stored in a non-volatile data memory of the control device 11, 11' and are loaded into the processor 110, 110' as a component of a configuration 61. For example, the processor 110, 110' serves the communication with the recognition device 10, 10' and is connected to the recognition device 10, 10' via a serial or parallel interface. The processor 110, 110' of the control device 11, 11' is preferably a microcontroller PIC16C63A. This is a modularly expandable family of proven processors.

Advantageously, the control device 11 has at least one bus processor 111. The bus processor 111 serves, for example, the communication between processors 110, 110' of different control devices 11, 11', and/or the communication with a computer 12, and/or the communication with at least one transportation means 13, and/or the communication with at least one access means 14. The bus processor 111 is preferably an Echelon MC143150B1 chip from Motorola or a Toshiba TMPN3150B1. The bus processor 111 has, for example, a non-volatile data memory. Stored in this non-volatile memory is, for example, the configuration 61. Advantageously, the processor 110, 110' of the control device 11, 11', or the processors 110, 110' of different control devices 11, 11', and the bus processor are connected to each other via an interface, preferably an SPI interface (SPI stands for serial peripheral interface), and communicate via a protocol bus. The clock frequency of the SPI interface is, for example, 20 kHz. The communication within a control device 11, or between different control devices 11, 11', is bidirectional and represented diagrammatically as a double-headed arrow. For example, in a configuration phase 21 the configuration 61 is loaded from the non-volatile data memory of the bus processor 111 into a processor 110, 110', while in a control-signal reading phase 23 a control signal according to a standard protocol 60 is transmitted from processor 110, 110' to the bus processor 111.

The control device 11, 11' is, for example, a circuit board in its own housing, or a circuit board for insertion into a housing, of the recognition device 10, 10' and/or the computer 12. The control device 11, 11' is, for example, connected via a commercially available interface to the computer 12. The computer 12 can be a commercially available personal computer or a workstation. The control device 11, 11' has access to a protocol library with at least one user profile A, A'. For example, the computer 12 has a memory to store at least one user profile A, A'. The control device 11 can have its own electric current supply to supply the processor of the control device 11, 11', but it can also be supplied with electric current from the computer 12, for example via a cable. Self-evidently, with knowledge of the present invention a person skilled in the art can realize unlimited variations of this embodiment of a control device. The presented embodiment of a control device is exemplary and not restrictive for the scope of application and/or protection of the invention. Thus, a software emulation of the control device is possible in, for example, a computer. The information regarding the processor used by the control device, the advantageous bus processor of the control device, the advantageous interfaces between recognition device and control device, and the interface between control device and computer, are also freely variable. The control device can also be realized with only one single processor for communication with a recognition device, or with other control devices, or with a computer, or with a transportation means or an access means.

The control device 11, 11' commands via at least one secondary control signal 5 at least one transportation means 13 or at least one access means 14. The control device 11, 11' recognizes at least one control signal 3, 3' of at least one recognition device 10, 10' and for one recognized control signal 3, 3' emits one secondary control signal 5. It is possible to use with the control device 11, 11' several different standards of information transmitters 1, 1', 1" or of recognition devices 10, 10' respectively, to command a transportation means 13 or an access means 14. The control device 11 recognizes control signals according to at least two different control protocols 3, 3' and in response emits a secondary control signal 5. Advantageously, the control device 11, 11' converts one recognized control signal into at least one control signal according to standard protocol 60. For example, but not necessarily, the standard protocol 60 is a preferred control protocol 3, 3'. Advantageously, the control device 11, 11' uses a control signal according to the standard protocol 60 as a form of key. Advantageously, with this key the control device 11, 11' opens exactly one user profile A, A' of a person or goods item to be transported. Advantageously, one control signal according to standard protocol 60 has assigned to it exactly one user profile A, A'. Stored in this user profile A, A' are multifarious data about the person or goods item to be transported, for example access rights, transportation destinations, etc. Advantageously, the control device 11, 11' uses this user profile A, A' to generate the secondary control signal 5. Advantageously, in response, the transportation means 13 or the access means 14 processes this user profile A, A' in communication with the control device 11, 11'. The communication between the control device 11, 11' and the transportation means 13 or the access means 14 is bidirectional and represented schematically as a double-headed arrow.

The transportation means 13 is preferably an elevator installation with at least one elevator and at least one elevator car in the embodiments according to FIGS. 2 and 3, or with three elevator cars in the embodiment according to FIG. 4. The vertical double-headed arrow adjacent to transportation means 13 indicates that the elevator car, hanging on a rope and driven by a drive, travels in upward and downward direction in the elevator hoistway. In the embodiments according to FIGS. 2 to 4, the access means 14 is at least one door. It is possible to make provision for a door which allows access to rooms and/or a stairway and/or an elevator installation, etc. The recognition device 10, 10' is arranged, for example, near the elevator installation or door. Preferably, but not necessarily, at least one recognition device 10, 10' is arranged on all entrances to the elevator installation or on all doors.

The control device 11, 11' and/or the computer 12 is/are not necessarily arranged near the recognition device 10, 10' or the transportation means 13 or the access means 14. For example, the control device 11, 11' and/or the computer 12 is/are arranged in a room of the building of the elevator installation suitable for them, for example a room of the janitor, custodian, etc. By commanding the elevator installation, the access authorization of the bearer of an identification transmitter 1, 1', 1" is checked and/or the bearer of an identification carrier 1, 1', 1" is transported by the elevator installation and/or the bearer of an identification carrier 1, 1', 1" is granted access to the access means 14. It also applies here that the scope of application and/or protection of the invention is not restricted to transportation means in the embodiment of an elevator installation or to access means in the embodiment of doors. Self-evidently, with knowledge of the present invention, a person skilled in the art can realize unlimited variations of the embodiment of a transportation means for transportation of persons or goods such as a passenger car, a railroad, a streetcar, an airplane, a conveyor belt, etc. Such a person can also realize unlimited variations of the embodiment of an access means to the security control of persons/goods such as a compartment, a flap, etc.

FIG. 1 is a block diagram of a means of functioning of the system 100 consisting of identification transmitter 1, 1', 1", recognition device 10, 10', control device 11, 11', and transportation means 13 or access means 14. The system 100 functions, for example, according to five different phases, 20, 21, 22, 23, 24:

In an initialization phase 20, after the control device 11, 11' is switched on, preferably, but not necessarily, the configuration 61 is loaded from the data memory of the control device 11, 11'. The initialization phase 20 takes place in the control device 11, 11'. The configuration 61 includes, for example, several control protocols 3, 3'. The configuration 61 contains, for example, a password to make access to a password-protected identification transmitter 1, 1', 1" possible. The configuration 61 contains, for example, an encryption code to realize non-interceptible, encrypted communication, such as radio communication, between recognition device 10, 10' and identification transmitter 1, 1', 1", etc. The configuration 61 contains, for example, information about the specific identification transmitter, such as which blocks should be read in from the memory of the identification transmitter 1, 1', 1". The configuration 61 contains, for example, information about a minimum time interval for differentiation and to avoid the same identification transmitter 1, 1', 1" being read in several times in succession. The configuration 61 contains, for example, information about which standards of identical identification transmitters 1, 1', 1" or recognition devices 10, 10' should be supported, as a result of which the number of control protocols 3, 3' supported is reduced from, for example, twenty to five, which accelerates execution of the method.

In a configuration phase 21, a recognition device 10, 10' is sought on the interface to the recognition device 10, 10' with at least two control protocols 3, 3'. The configuration phase 21 takes place in the control device 11, 11'. Such an inquiry with a control protocol 3, 3' takes place, for example, cyclically. In configuration 61 is defined, for example, with which control protocol 3, 3', or in what sequence of control protocols 3, 3', the control device 11, 11' carries out an independent inquiry on a recognition device 10, 10'. For example, the control device 11, 11' inquires according to a first control protocol 3 for a current software version of the recognition device 10, 10'. For example, the control device 11, 11' inquires according to a first control protocol 3 for the boot status of the recognition device 10, 10'. If within a certain time there is no response to such an inquiry according to a first control protocol 3, it is assumed that the recognition device 10, 10' does not know this control protocol 3 and this inquiry is repeated by the control device 11, 11' with another control protocol 3'. To a person skilled in the art, many control protocols 3, 3' are known which are often proprietary, i.e. manufacturer specific, and therefore have little or practically no compatibility with each other. Such control protocols 3, 3' are freely available or commercially available.

For example, the following serial control protocols 3, 3' are supported:

Baltic ID Engine, Rev. 1.01.

Feig Electronic OBID ID RW Family, Version 4.07.

id Systems Ltd., packed-based RS232 Communications Protocol, Version 3.30.

For example, the following parallel control protocol 3, 3' is supported:

Philips HTRM 310.

In a response-signal reading phase 22, the recognition device 10, 10' reads in a response signal 2, 2', 2" of an identification transmitter 1, 1', 1". The response-signal reading phase 22 takes place between the identification transmitter 1, 1', 1" and the recognition device 10, 10'. The response signal 2, 2', 2" comprises, for example, information about an identification transmitter standard and/or about the serial number of the identification transmitter 1, 1', 1" and/or the identification code of the identification transmitter 1, 1', 1". The response signal 2, 2', 2" of an identification transmitter 1, 1', 1" is recognized by the recognition device 10, 10' with a recognition protocol.

As soon as the control device 11, 11 ' has established a communication with a recognition device 10, 10' according to a control protocol 3, 3', in a control-signal reading phase 23 an inquiry for a control signal takes place according to at least one control protocol 3, 3'. The control-signal reading phase 23 takes place between the recognition device 10, 10' and the control device 11, 11'. Advantageously, inquiry for such a control signal is made in an endless loop. For example, inquiry is made for a serial number of an identification transmitter 1, 1', 1" and/or for an identification code of an identification transmitter 1, 1', 1". A control signal according to a control protocol 3, 3' of a recognition device 10, 10' is recognized by the control device 11, 11' with a corresponding identical control protocol 3, 3'. Advantageously, the control device 11, 11' converts recognized control signals according to different control protocols 3, 3' into control signals according to the uniform standard protocol 60.

In a command phase 24, for one recognized control signal the control device 11, 11' emits at least one secondary control signal 5. With this secondary control signal the transportation means 13 or the access means 14 is commanded. The control phase 24 takes place between the control device 11, 11' and the transportation means 13 or the access means 14. For example, the control device 11 commands an elevator installation or a door according to the secondary control signal 5. With the secondary control signal 5, in a first function the bearer of the identification transmitter 1, 1', 1" is allowed access to the elevator installation or to the door, and/or in a second function the bearer of the identification transmitter 1, 1', 1" is transported to a destination floor. Advantageously, the control device 11, 11' assigns to the control signal exactly one user profile A, A' according to standard protocol 60. Stored in this user profile A, A' is, for example, information about the access authorization of the person/goods and/or information about a destination floor. This user profile A, A' is used for generation of the secondary control signal 5. Thereupon, the elevator installation processes this user profile A, A' in communication with the control device 11, 11'.

Figure 5:
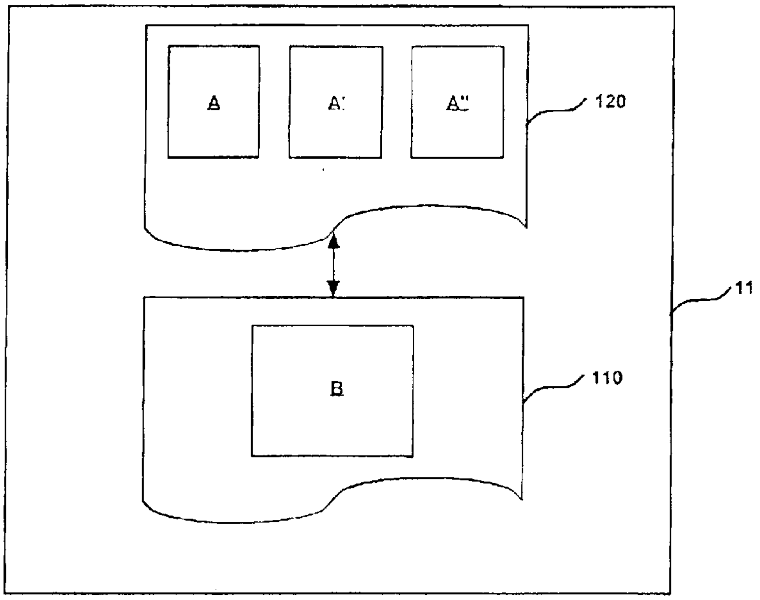
FIG. 5 is a block diagram of the linking of user profiles to a transportation profile of the system for transporting persons/goods according to FIGS. 1 to 4.

FIG. 5 shows a block diagram of the links from user profiles A, A', A" to at least one transportation profile B. The control device 11 is, for example, a commercially available personal computer or a work station. The control device 11 has a processor 110 for linking the user profiles A, A', A" to a transportation profile B. The processor 110 can have a non-volatile memory. The control device 11 has access to a memory 120 with user profiles A, A', A". For example, the memory 120 with user profiles A, A', A" is arranged in the control device 11. For each recognized identification code 3, at least one user profile A, A', A" from the memory 120 is made ready and in the processor 110, advantageously according to at least one logical gate such as "AND", "OR", "NOT", etc., linked to the transportation profile B.

The arrangement and linking of the user profiles A, A', A" is carried out by at least one computer program product. The computer program product serves to command the system 100 to transport persons/goods. The computer program product is, for example, written in a well-known and proven computer language. For example, the computer program product is implemented in any computer intended for its execution, for example the computer program product is stored in a memory and is loaded into a processor for execution of the computer program product. For example, this computer is the control device 11, for example the computer program product is stored in the memory 120 of the control device 11, and, for example, the computer program product is loaded into the processor 110 of control device 11. The computer program product is in known manner storable, reproducible, and updatable. Self-evidently, with knowledge of the present invention a person skilled in the art can realize unlimited variations of this embodiment of a computer program product. Thus, for the purpose of the invention it is not necessary for the computer program to be implemented in the control device. It is entirely possible to implement the computer program product in any separate computer intended for execution of the computer program product and to communicate the result of the execution of the computer program product to the control device. For example, the computer program product is implemented in a remote server. For this purpose the control device can be connected with such a computer by, for example, wire or radio, or by, for example, the Internet.

Advantageously, the control device 11 has a bus processor. The bus processor serves, for example, communication between the processor 110 of the control device 11 and the means of transportation 13. The control device 11 commands the means of transportation 13 according to the transportation profile B via at least one secondary control signal 5. Self-evidently, with knowledge of the present invention a person skilled in the art can realize unlimited variations of a control device. Thus, with the secondary control signal an access means, for example in the embodiment according to FIG. 2, can be commanded. The embodiment of a control device shown is exemplary and not restrictive for the scope of application and/or protection of the invention. For example, the control device can be constructed as an insert, set-top box, etc. for a recognition device. It is also possible to arrange the memory with user profiles in a remote server, and to communicate user profiles to the control device by, for example, wire or radio, or by, for example, the Internet. This makes it possible to provide a secure and/or central remote server for all user profiles. It is also possible to communicate user profiles from a memory of a remote server to the control device with or without being requested by the control device.

Figure 7:
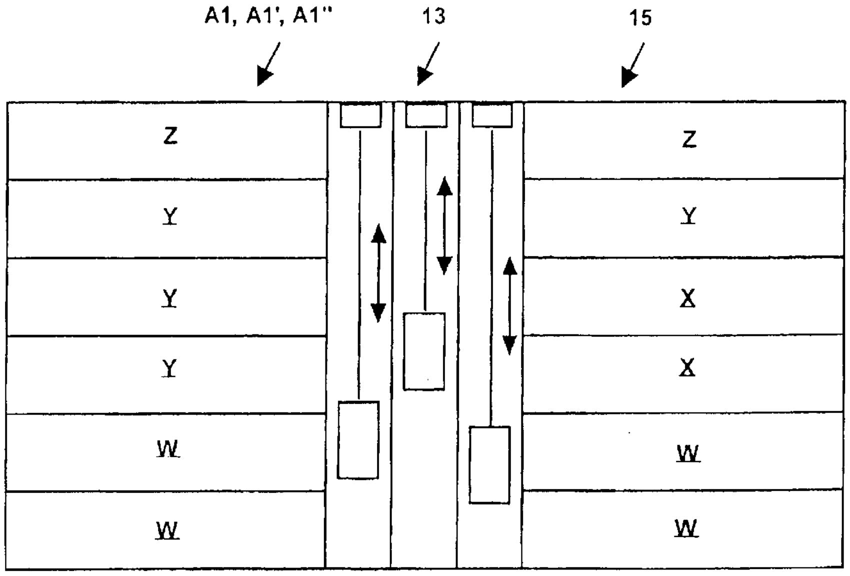
FIG. 7 is a schematic diagram of a part of a zone profile of the system for transportation of persons/goods according to FIGS. 1 to 4.
Figure 8:
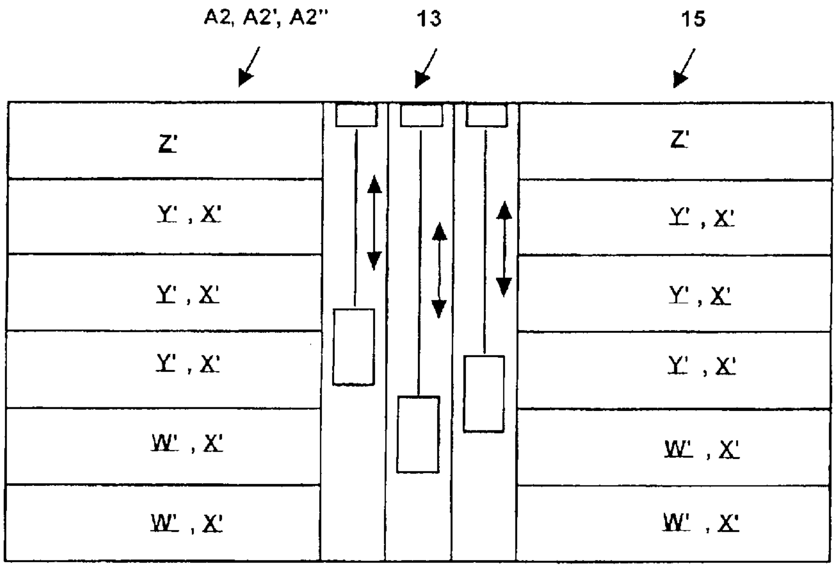
FIG. 8 is a schematic diagram of a part of a period profile of the system for transportation of persons/goods according to FIGS. 1 to 4.

The means of transportation 13 is, for example, an elevator installation with one or more elevators which transport persons/goods in, for example, the transportation direction of the double-headed arrow according to FIG. 7 or 8. For example, the elevator installation has three elevators which have entrance/exit points on various floors of a building 15. For example, the three elevators are arranged adjacent to each other in the building 15 with offices and thus permit simultaneously parallel transportation of persons/goods. This presented embodiment of a means of transportation is exemplary. However, with knowledge of the present invention, a person skilled in the art can also use other means of transportation such as moving walks, conveyor belts, doors, as well as railroads, underground railroads, streetcars, cable cars, aircraft, etc. For example, the means of transportation is a door, which is opened according to a command signal of the control device, to give a person and/or item of goods access to a room, a stairway, a corridor, etc.

Figure 6:
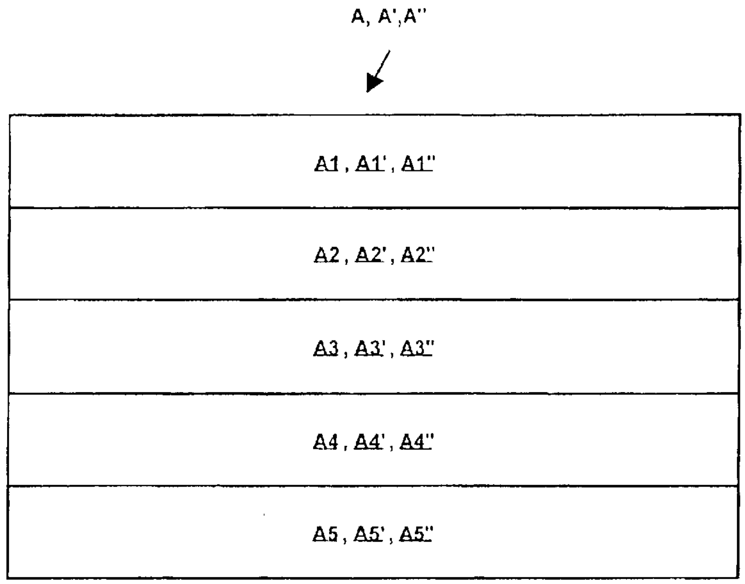
FIG. 6 is a diagram of a part of a user profile of the system for transportation of persons/goods according to FIGS. 1 to 4.

FIG. 6 is an exemplary embodiment of a user profile A, A', A". Advantageously, the user profile profile A, A', A" has at least one spatial user profile or zone profile A1, A1', A1" and/or at least one temporal user profile or period profile A2, A2', A2", and/or at least one person/goods-specific user profile or individual profile A3, A3', A3", and/or at least one group-specific user profile or group profile A4, A4', A4", and/or at least one security-relevant user profile or security profile A5, A5', A5".

In the zone profile A1, A1', A1" the spatial access authorization of the user in zones is defined. Zones are to be understood as spatially related areas. The zones can be related or unrelated. An exemplary embodiment of such a zone profile A1, A1', A1" is represented in the diagram according to FIG. 7. Visible in this diagram is a multi-story building 15 in which several elevators as means of transportation 13 transport persons/goods. For example, the building 15 is divided into a left-hand and a right-hand half. For example, the half-stories of the building 15 are subdivided into four zones, W, X, Y, and Z. For example, the zone W is a zone with low access priority, to which practically all users as well as visitors and guests have access. For example, zone W comprises the entrance/reception on the ground floor of the building 15 and a user restaurant on the first floor of the building 15. For example, zones X and Y are two zones with medium access priority, to which only users with certain privileges have access. For example, employees of companies which have offices in the half-stories of the zones X and Y have access to these zones X and Y. For example, the zone Z is a zone with high access priority, to which only users with certain privileges have access. For example, it comprises a penthouse apartment to which only the owner(s)/tenant(s) of the penthouse apartment has/have access. Zones of the same access priority need not adjoin each other. Advantageously, each zone is accessible with a means of transportation 13 of the invention. Self-evidently, with knowledge of the present invention a person skilled in the art can realize unlimited variations of a zone profile. The embodiment of a control device shown is exemplary and not restrictive for the scope of application and/or protection of the invention. For example, the zone profile can be subdivided even more finely, i.e. into even more than four zones. Self-evidently, it is also possible to subdivide the zone profile into fewer than four zones.

In the period profile A2, A2', A2" temporal rights of the user in periods are defined. Periods are to be understood as temporally related areas. The periods can be of regular length or of irregular length. An exemplary embodiment of such a period profile A2, A2', A2" is represented in the diagram according to FIG. 8. In this embodiment the temporal rights are temporal rights according to periods W', X', Y', Z'. FIG. 8 shows a multi-story building 15 in which several elevators as means of transportation 13 transport persons/goods. For example, the building 15 is divided into a left-hand and a right-hand half. For example, the half-stories of the building 15 are subdivided into four periods W', X', Y', Z'. For example, the period W is a period with low access priority, during which practically ails users as well as visitors and guests have access. For example, period W' comprises a period from 7 am to 8 pm, during which the entrance/reception on the ground floor of the building 15 as well as a user restaurant on the first floor of the building 15 are accessible. For example, periods X' and Y' are two periods with medium access priority, during which only users with certain privileges have access. For example, period X' comprises a period for cleaning personnel of the entrance/reception, of the user restaurant, and of the offices in building 15. For example, the duration of this period X' is from 9 pm to 12 midnight. For example, employees of companies which have offices in the half-stories of the period Y' have access to these offices during this period Y'.

For example, the period Y' extends from 7 am to 6 pm. For example, the period Z' is a period with high access priority, during which only users with certain privileges have access. For example, it comprises a penthouse apartment to which only the owner(s)/tenant(s) of the penthouse apartment has/have access during a period Z' of 24 hours a day. Periods of the same access priority need not adjoin each other. Advantageously, each period is accessible with a means of transportation 13 of the invention. Self-evidently, with knowledge of the present invention a person skilled in the art can realize unlimited variations of a period profile. The embodiment of a period profile shown is exemplary and not restrictive for the scope of application and/or protection of the invention. For example, the period profile can be subdivided even more finely, i.e. into even more than four periods. Self-evidently, it is also possible to subdivide the period profile into fewer than four periods. Finally, the durations of the periods can be freely set. The period profile is also to be interpreted broadly, and not restricted to a temporal access authorization. The temporal rights can be combined, for example, with the individual profile, so as to vary preferences of the user temporally in periods (for example, pop music on Monday, classical music on Friday, etc.).

In the individual profile A3, A3', A3", individual items of information about the user are defined. Examples of items of information of the individual profile A3, A3', A3" are: the user name, the office/floor, the building/office number, at least one telephone number, the birthday (this allows greeting of the user in the means of transportation 13 on his/her birthday), the sex, the weight (this permits more efficient utilization of the means of transportation 13), etc. However, also defined in the individual profile A3, A3', A3" can be, for example, preferences of the user such as the type of news (for example, the weather forecast, the stock exchange, etc.) which the user does or does not wish to receive in the means of transportation, the type of music (for example, pop music, jazz music, classical music, etc.) which the user does or does not wish to receive in the means of transportation 13. Self-evidently, with knowledge of the present invention a person skilled in the art can realize unlimited variations of an individual profile. The described embodiments of an individual profile are exemplary and not restrictive for the scope of application and/or protection of the invention. For example, the individual profile can be refined in that news items are provided to the user in a special sequence (for example, first the weather, then the stock exchange), etc. Also defined can be that the user finds jazz music, for example, very unpleasant and wishes to be spared it.

In the group profile A4, A4', A4" information is stored about the priority when transporting users, etc. For example, certain users of the means of transportation 13 are of special significance and importance for a company. Periods of time spent by such important users in the means of transportation 13 represent unusable time or lost time. Many such important users are, however, frequently transported in the means of transportation 13. It is therefore essential to avoid such important users losing much time in the means of transportation 13. For this reason they are transported with high priority. High priority means that transportation of an important user receives higher weighting than that of a standard user. For example, the control device 11 values transportation of an important user as four times the transportation of a standard user. When such an important user is recognized by means of an identification code or response signal, the control device 11 attributes to the recognized identification code or response signal a physical presence of, for example, four standard users, the control device behaves as if four standard users would indicate to a recognition device their wish to be transported with the means of transportation, in fact only one important person does this. Self-evidently, with knowledge of the present invention a person skilled in the art can realize unlimited variations of a group profile. The described embodiments of a group profile are exemplary and not restrictive for the scope of application and/or protection of the invention. For example, the group profile can be refined so as to differentiate not only between important users and standard users, but so that, for example, three or four such weightings are made.

Defined in the security profile A5, A5', A5" are items of information about security aspects of the user such as a hazard/risk assessment (Does/do the person/goods present a hazard? And if so, for which other person/goods to be transported? Is/are the persons/goods exposed to hazards? And if so, what steps should be taken if an emergency occurs?). It can also be specified, for example, whether an item. of goods to be transported belongs to a hazardous category, and if so, it can also be specified what steps are to be taken should an accident occur with this item of goods, it can also be specified whether the item of goods may be transported with an item of goods from another hazardous category, and if so, with which and in what quantities. For example, it can be specified whether a user to be transported suffers from asthma. And it can be specified whether, in case the user has an attack of asthma, a medication, and if so what sort, is to be taken. Parts of security profile A5, A5', A5" and/or the entire security profile A5, A5', A5" can be accessible via means such as, for example, a monitor and/or a loudspeaker in the transportation means 13. However, parts of security profile A5, A5', A5" and/or the entire security profile A5, A5', A5" can also be made accessible to specialized and responsible personnel, for example first-aiders and/or fire fighters. The access to security profile A5, A5', A5" can be regulated in various ways. For example, after an alarm is triggered in the means of transportation 13, the security profile A5, A5', A5" is automatically made partially and/or completely accessible. Self-evidently, with knowledge of the present invention a person skilled in the art can realize unlimited variations of a security profile. The described embodiments of a security profile are exemplary and not restrictive for the scope of application and/or protection of the invention.

Figure 9:
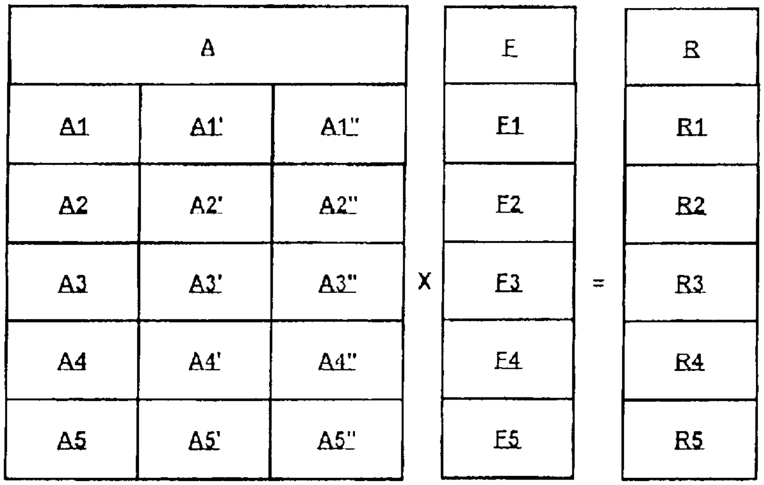
FIG. 9 is a schematic diagram of a part of a transportation profile of the system for transportation of persons/goods according to FIGS. 1 to 4.

FIG. 9 shows a diagram of a part of a transportation profile B of the system for transportation of persons/goods. This exemplary embodiment of a transportation profile B is based on, for example, three user profiles A, A', A" in the embodiment according to FIG. 7. Advantageously, each user profile A, A', A" has at least one spatial user profile or zone profile A1, A1', A1", at least one temporal user profile or period profile A2, A2', A2", at least one person/goods-specific user profile or individual profile A3, A3', A3", at least one group-specific user profile or group profile A4, A4', A4", and at least one security-relevant user profile and/or security profile A5, A5', A5".

These three user profiles A, A', A" of persons/goods to be transported are linked to at least one transportation profile B. Specifically, the linking of the user profiles A, A', A" takes place according to the rules of at least one function F. For example, zone profiles A1, A1', A1" are linked according to at least one zone function F1. For example, period profiles A2, A2', A2" are linked according to at least one period function F2. For example, individual profiles A3, A3', A3" are linked according to at least one individual function F3. For example, group profiles A4, A4', A4" arc linked according to at least one group function F4. For example, security profiles A5, A5', A5" are linked according to at least one security function F5. Advantageously, the function F is at least one logical gate such as "AND", "OR", "NOT", etc.

The result R of this linking is output, for example, as at least one zone result R1, for example as at least one period result R2, for example as at least one individual result R3, for example as at least one group result R4, for example as at least one security result R5.

There follows below a presentation of the invention based on a demonstration example. For example, several persons are recognized by a response signal 2 of a recognition device 10 and unambiguously identified by a recognized response signal of the control device 11. For example, these persons are currently on a certain floor (for example, on the ground floor) of the building 15 in front of a means of transportation 13 in the form of an elevator installation. The user profiles A, A', A" of these persons are linked to a transportation profile B. For example, the result of linking the individual profiles A3, A3', A3" of these persons according to an individual function F3 is that several of these waiting persons wish to be transported to the same floor (for example, the sixth floor) of the building 15. The resulting transportation profile B thereby results in a secondary control signal 5 to the elevator installation, which secondary control signal 5 states that the waiting persons who wish to be transported to the 6th floor arc to be directed (for example, by light signals and/or acoustic signals) to a designated elevator of the elevator installation and transported as one group direct to their travel destination on the 6th floor.

Transportation according to a transportation profile B is therefore more efficient, since the resources of the elevator installation are optimized. Transportation according to a transportation profile B is also more comfortable for the persons/goods to be transported since, for example, a designated elevator travels direct to the travel destination and does not stop on the way. Finally, transportation according to a transportation profile B allows selective prevention of undesired transportation preferences, for example in the designated elevator such news items are selectively avoided which none of the persons to be transported wishes to receive.

In this manner it is also possible for the manufacturer of the means of transportation 13 to perform not only the maintenance and servicing of the means of transportation 13, but also the maintenance, servicing, and updating of the user profile A, A', A". This is a new service offering which enables the manufacturer of the means of transportation 13 to retain many customers. Particularly for international companies with company offices in many cities, this service offering can be helpful and purposeful. For example, a manufacturer of elevator installations can then not only maintain and service the elevator installations in correspondingly many buildings 15 and/or stories of these customers/companies, he can also maintain, service, and/or update the user profiles A, A', A" for these many buildings 15. The user profiles A, A', A" can be matched to each other and/or exchanged and/or centrally administered. For example, user profiles in all buildings/stories of a customer/company are compatible with each other. An important user is then, for example, transported as such not only in a first building of a customer/company but also in another building of the customer company. This enables the efficiency of the elevator installation to be increased, since in all buildings 15 user profiles A, A', A" are used and/or user profiles A, A', A" are linked to transportation profiles B, and it results in increased satisfaction of the needs of the persons/goods to be transported.

In this manner it is also possible to perform time-recording according to at least one user profile A, A', A". For example, the presence of a user in at least one zone W. X, Y, Z of a building 15 of system 100 is recorded as zone time, i.e. as difference in time between at least one entry to and leaving of zone W, X, Y, Z. For example, a user is recognized at 8 am at the entrance/reception of the building 15 via a response signal 2, a user profile A, A', A" with zone profile A1, A1', A1" is assigned to the recognized response signal, and according to the zone profile A1, A1', A1" the user enters a zone W, X, Y, Z of the building 15. This access time to zone W, X, Y, Z is recorded. Later, for example at 12 noon, the user leaves this zone W, X, Y, Z. The user is again recognized via a response signal 2, a user profile A, A', A" is assigned to the recognized response, and the user leaves the zone W, X, Y, Z. This time of leaving zone W, X, Y, Z is recorded. In this way, zone times in buildings/floors of a customer/company can be listed for time recording.

This time recording takes place according to at least any one criterion of the user profile A, A', A". For example, per time unit and per zone W, X, Y, Z the zone times of each user are recorded. Each of these user-specific zone times is multiplied by a corresponding user-specific salary-cost value to give a user-specific zone-time salary-cost value. The user-specific zone-time salary-cost values are added to give a zone salary-cost total. This enables work projects of this customer/company to be divided zone-specifically, and salary costs to be recorded zone-specifically and user-specifically per time unit. Self-evidently, with knowledge of the present invention a person skilled in the art can realize other unlimited variations not stated here of time recording based on a user profile.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for operating a system for controlled access to multiple destinations by persons or goods wherein identification transmitters emit response signals to associated recognition devices and each recognition device emits a control signal in response to recognizing one of the response signals, the method comprising the steps of:

a) storing a user profile including access information for a user to a predetermined one of multiple destinations, the user being a person or goods;

b) providing an identification transmitter associated with the user profile and transmitting a response signal from the identification transmitter to a recognition device, the response signal identifying the user;

c) generating a control signal according to a control protocol from the recognition device upon recognizing the response signal, the control protocol being one of a plurality of different predetermined control protocols;

d) converting the control signal into a standard protocol and generating a secondary control signal from the control device based upon access information in the stored user profile upon recognizing the standard protocol control signal; and e) controlling the system in response to the secondary control signal to provide access for the user to the predetermined one destination, said steps c) through e) being performed without action by the user.

2. The method according to claim 1 wherein said step c) is performed by at least one of operating an access means to allow the user access to the predetermined one destination and commanding a transportation means to deliver the user to the predetermined one destination.

3. The method according to claim 2 including using the user profile as a transportation profile for commanding the transportation means.

4. The method according to claim 1 including performing said steps a) through c) for another user and performing said step d) by generating the secondary control signal based upon the access information in both the stored user profiles upon recognizing both of the control signals.

5. The method according to claim 4 including combining the user profiles as a single transportation profile for commanding a transportation means to deliver the users to the predetermined one destination.

6. A control apparatus for controlling a system for controlled access to multiple destinations by persons or goods comprising:

storage means for storing a user profile including access information for a user to a predetermined one of multiple destinations, the user being a person or goods;

an identification transmitter associated with said user profile and transmitting a response signal identifying the user;

a recognition device generating a control signal according to a control protocol upon recognizing said response signal, said control protocol being one of a plurality of different control protocols; and a control device connected to said storage means and to said recognition device for recognizing said one control protocol, for converting said control signal from said one control protocol into a standard control protocol and for generating a secondary control signal based upon said access information in said stored user profile upon recognizing said control signal, said secondary control signal being adapted to control the system to provide access for the user to the predetermined one destination.

7. The control apparatus according to claim 6 wherein the system is at least one of a transportation means and an access means.

8. The control apparatus according to claim 7 wherein said control device uses said user profile as transportation profile for commanding the transportation means.

9. A control apparatus for controlling a system for controlled access to multiple destinations by persons or goods comprising:

storage means for storing at least two user profiles each including access information for an associated user to a predetermined one of multiple destinations, the users being a person or goods;

a plurality of identification transmitters each associated with one of said user profiles and transmitting a unique response signal identifying the user;

at least one recognition device generating a control signal according to a control protocol upon recognizing each of said response signals, said control protocol being one of a plurality of predetermined control protocols; and a control device connected to said storage means and to said recognition device for converting said control signals to a standard protocol and for generating a secondary control signal based upon said access information in two of said stored user profiles upon recognizing said standard protocol control signals associated with said two user profiles, said secondary control signal being adapted to control the system to provide access for the associated users to the predetermined one destination whereby said control signals and said secondary control signal are generated without action by the users.

* * * * *

UNITED STATES PATENT AND TRADEMARK OFFICE

CERTIFICATE OF CORRECTION

PATENT NO. : 6,869,014 B2
APPLICATION NO. : 10/228299
DATED : March 22, 2005
INVENTOR(S) : Bernhard Gerstenkorn It is certified that error appears in the above-identified patent and that said Letters Patent is hereby corrected as shown below:

Under the Claims, Claim 2:
In col. 18 at line 66, “step c)” should be changed to “step e)”.

Signed and Sealed this
Twentieth Day of March, 2012

David J. Kappos
*Director of the United States Patent and Trademark Office*